United States Patent [19]

Kowalik et al.

[11] Patent Number: 4,508,128

[45] Date of Patent: Apr. 2, 1985

[54] DRAG REDUCTION AGENT FOR HYDROCARBON LIQUID

[75] Inventors: Ralph M. Kowalik, Bridgewater; Ilan Duvdevani, Leonia; Dennis G. Peiffer, East Brunswick; Robert D. Lundberg, Bridgewater, all of N.J.

[73] Assignee: Exxon Research & Engineering Co., Florham Park, N.J.

[21] Appl. No.: 547,909

[22] Filed: Nov. 2, 1983

[51] Int. Cl.³ ............... C08L 79/04; C08L 81/08; F17D 1/17
[52] U.S. Cl. .................. 137/13; 523/175; 524/504; 524/505; 524/510; 524/526
[58] Field of Search ............. 525/203; 137/13; 524/504, 505, 510, 526; 523/175

[56] References Cited

U.S. PATENT DOCUMENTS

| | | | |
|---|---|---|---|
| 3,558,744 | 1/1971 | Michaels et al. | 525/203 |
| 3,974,241 | 8/1976 | Lundberg et al. | 525/186 |
| 4,108,193 | 8/1978 | Flournoy et al. | 137/13 |
| 4,188,351 | 2/1980 | Chung | 525/203 |
| 4,436,846 | 3/1984 | Krantz | 523/175 |

FOREIGN PATENT DOCUMENTS 7514535  3/1976  Netherlands ............ 523/175

Primary Examiner—Allan M. Lieberman
Attorney, Agent, or Firm—Richard E. Nanfeldt

[57] ABSTRACT

The present invention relates to improved drag reduction agents which are polymer complexes of a cationic polymer and an anionic polymer.

2 Claims, 1 Drawing Figure

DRAG REDUCTION AGENT FOR HYDROCARBON LIQUID

FIELD OF THE INVENTION

To flow liquids in pipes, energy must be expended to overcome frictional losses. This energy is extracted from the liquid pressure, which decreases along the pipe in the direction of flow. For a fixed pipe diameter, these pressure drops increase with increasing flow rate. When flow in the pipe is turbulent (flow Reynolds number = means fluid velocity × pipe diameter ÷ fluid kinematic viscosity greater than about 2000) the relationship between pressure drop and flow rate can be altered by the addition of small amounts of certain high molecular weight linear polymers to the liquid. These polymers interact with the turbulent flow processes and reduce frictional pressure losses such that the pressure drop for a given flow rate is less, or the flow rate for a given pressure drop is larger. This phenomenon is commonly called drag reduction. It has been used in commercial oil pipelines, fire hoses and storm sewers to increase the flow capacities of existing systems. It can also be used to reduce supply pressures, pumping costs, and/or pipe diameters for given flow capacities.

BACKGROUND OF THE INVENTION

High molecular weight hydrocarbon soluble polymers, such as polyisobutylene, polystyrene, and several α-olefins, have been demonstrated to reduce drag in turbulent flows of hydrocarbon liquids. Generally, the drag reduction effectiveness of these polymers improves with increasing molecular weight; however, the tendency for the polymers to permanently degrade via molecular scission in local extensional flows within pumps or turbulent pipeflows also increases with increasing polymer molecular weight. This invention discloses efficient drag reduction in hydrocarbon liquids resulting from a novel class of interpolymer complexes containing, for example, a styrene/vinyl pyridine (SVP) random copolymer and a randomly sulfonated ethylene propylene diene monomer (S-EPDM) copolymer. These complexes can provide improved drag reduction via enhanced molecular interactions rather than increased molecular weight and, consequently, may be less sensitive to flow degradation.

PRESENT INVENTION

The present invention discloses drag reduction agents for hydrocarbon liquids which are polymer complexes of cationic and anionic polymers.

SUMMARY OF THE INVENTION

The present invention relates to unique and novel drag reduction agents for hydrocarbon liquids which are hydrocarbon solutions of water insoluble polymer complexes of an anionic polymer and a cationic polymer, wherein the hydrocarbon solution of the polymer complex is formed by the mixing of a hydrocarbon solution of the anionic polymer with a hydrocarbon solution of the cationic polymer. The necessary concentration range of the polymer complex in the hydrocarbon liquid in order to have an effective drag reduction agent is about 0.001 to about 1.00 grams/polymer complex per 100 ml of hydrocarbon liquid. Moreover, the complex can be destroyed by adding a small amount of an additive, such as an alcohol or other polar additives, which is strongly interfering with the complexation mechanism.

The polymer complexes of the instant invention, which are effective drag reduction agents for hydrocarbon liquids, comprise the reaction product of a anionic polymer such as sulfonated polymer, and a cationic polymer such as a basic amine-containing polymer, for example, styrene vinyl pyridine copolymer.

The number of sulfonate groups contained in the sulfonated polymer of the polymer complex is a critical parameter affecting this invention. The number of sulfonate groups present in the polymer can be described in a variety of ways such as weight percent, mole percent, number per polymer chain, etc. For most polymer systems of interest in this invention, it is desirable to employ mole percent. For vinyl homopolymers, such as polystyrene, the sulfonated analog having a sulfonate content of 1.0 mole percent means that one out of every 100 monomer repeat units in the polymer chain is sulfonated. In the case of copolymers, the same definition applies, except for the purposes of this calculation, the polymer can be considered to be prepared from a hypothetical monomer having an average molecular weight, which is the average of two monomer components. Similarly for terpolymers, the same averaging concepts apply; however, three components are involved. For example, ethylene-propylene-ethylidene norbornene (ENB) is a preferred polymer backbone for this invention. A representative terpolymer would have a composition (weight percent) of 50% ethylene, 45% propylene and 5% ENB. This composition has an average repeat unit molecular weight of about 38.9. Thus, sulfonation of this composition, which occurs at the unsaturation of the ENB units to a level of 1.0 mole percent, which means that in 38.9 gms (1 mole of average monomer repeat units) of this polymer, there would be present 0.01 mole of sulfonic acid groups. An alternate way of expressing this is to state the sulfonate level in terms of milliequivalents of sulfonic acid groups per 100 gms of polymer. This latter procedure provides a rapid and independent measure of sulfonic acid content in a polymer through simple titration. This value is obtained from the above by simply stating the moles or equivalents of acid per 100 gms: $(100/38.9) \times (1/0.01) = 0.0257$ or $1000 \times 0.0257 = 25.7$ milliequivalents acid/100 gms of polymer for each 1 mole% of sulfonation.

Both mole percent sulfonate and milliequivalent of sulfonate will be employed to describe the sulfonate polymers employed in this invention.

In general, the sulfonated polymer will comprise from 0.1 to 25 mole percent pendant sulfonate groups, more preferably from 0.2 to 10 mole percent pendant sulfonate groups. The sulfonated polymers utilized in the instant invention are neutralized with the basic materials selected from the group consisting of Groups IA, IIA, IB and IIB of the Periodic Table of Elements and lead, tin, and antimony. Sulfonated polymers which are subject to the process of the instant invention are not limited to and include both plastic and elastomeric polymers. Specific polymers include sulfonated polystyrene, sulfonated t-butyl styrene, sulfonated polyethylene, sulfonated polypropylene, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers.

Neutralization of the cited sulfonated polymers with appropriate metal hydroxides, metal acetates, metal oxides, etc. can be conducted by means well-known in the art. For example, the sulfonation process, as with Butyl rubber containing a small 0.3 to 1.0 mole percent unsaturation, can be conducted in a suitable solvent such as toluene with acetyl sulfate as the sulfonating agent. The resulting sulfonic acid derivative can then be neutralized with a number of different neutralization agents such as sodium acetate, sodium ethoxide, sodium hydroxide, sodium phenolate and similar metal salts. The amounts of such neutralization agents employed will normally be stoichiometrically equal to the amount of free acid in the polymer plus any unreacted reagent which still is present. It is preferred that the amount of neutralizing agent be equal to the molar amount of sulfonating agent originally employed plus 10% more to ensure full neutralization. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be effected.

The degree of neutralization of said ionomeric groups may vary from 50 to 500 mole percent, preferably 90 to 200%. Most preferably, it is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralizing material may be utilized without defeating the objects of the instant invention.

The sulfonated polymers of the instant invention may vary in number average molecular weight as measured by GPC from 1,000 to 10,000,000, preferably from 5,000 to 500,000, most preferably from 10,000 to 200,000. These polymers may be prepared by methods known in the art; for example, see U.S. Pat. No. 3,642,728, hereby incorporated by reference.

The preferred ionic EPDM terpolymers for use in the instant invention have ethylene levels of 30–80 weight percent, 0.2–10 weight percent diene monomer such as ethylidene nordornene and the balance being propylene. Preferred sulfonation levels are 2–40 meg/100 g. Other specific examples of preferred ionomeric polymers which are useful in the instant invention include sulfonated polystyrene, sulfonated poly-t-butyl styrene, sulfonated polyethylene, (substantially non-crystalline) and sulfonated polyethylene copolymers, sulfonated polypropylene (substantially noncrystalline), and sulfonated polypropylene copolymers, sulfonated styrene-methyl methacrylate copolymers, (styrene)-acrylic acid copolymers, sulfonated polyisobutylene, sulfonated ethylenepropylene terpolymers, sulfonated polyisoprene, sulfonated polyvinyl toluene, and sulfonated polyvinyl toluene copolymers and isoprene-styrene sulfonate copolymers formed by a free radical copolymerization process.

We have found surprisingly that a very important factor in determining the strength of the interaction between the basic nitrogen-containing polymer and the sulfonate containing polymer is the nature of the counter ion. There are broadly speaking three major classes of such counter ions. The first class which are less preferred are those metals of Group I, and Group IIA, which include Li, Na, K, etc. Be, Mg, Ca, etc. We have found that these species do not interact as strongly with amine groups as the more preferred species described below. Those metals commonly defined as members of the transition elements (see Chemical Text: Chemical Principles and Properties by M. J. Sienko and R. A. Plane; McGraw Hill Book Co. 1974, page 19). These metal cations are best exemplified by zinc and interact strongly with pyridine and similar amines. As a consequence a zinc neutralized sulfonated polymer interacts much more strongly with a styrene/vinyl pryidine copolymer than does a magnesium or sodium neutralized system. It is for this reason that the transition elements are preferred with zinc, copper, iron, nickel and cobalt being especially preferred. We also include antimony and lead as suitable cations.

A third species which is preferred is the free acid of the sulfonated polymer which will also interact with amine containing polymers. In this latter case it is clear that the interaction is a classic acid base interaction, while with the transition metals a true combination complex is created which is due to the donation of the election pair of the nitrogen element. This distinction is a very important one and sets these complexes apart from classic acid-base interactions. The surprising observation is that such coordination complexes can form in such extreme dilution in so far as interacting groups are concerned, and that they are apparently formed so far removed for their expected stoichiometry, (based on small molecular anologs).

A variety of polymer backbones will display the desireable properties discovered in this invention:

| Sulfonate Polymers | Amine Polymers |
|---|---|
| Sulfo-EPDM | Styrene/Vinyl Pyridine Copolymer |
| Sulfonated Isoprene Copolymers | Vinyl Pyridine/Styrene/ Butadiene Terpolymers |
| Sulfonated SBR | Isoprene/Vinyl Pyridine Copolymer |
| Sulfonated Butadiene | Ethylacrylate/Vinyl Pyridine Copolymer and alkyl acrylate copolymers with vinyl pyridine where the alkyl group varies in carbon number from 1 to 18. |
| Sulfonated Butyl | |
| Sulfonated Acrylate and Methacrylate copolymers | |
| Sulfonated Block Polymers | Methyl methacrylate/Vinyl pyridine copolymers and alkyl methacrylate copolymers with vinyl pyridine wherein the number of carbon groups in the alkyl group varies from 1 to 18 carbon atoms Butadiene/Vinyl Pyridine Copolymer Propylene/Vinyl Pyridine Block Copolymer Ethylene/Vinyl Pyridine Block Copolymer t-butyl styrene/vinyl pyridine copolymers |

The amount of vinyl pyridine in the amine containing polymer can vary widely, but should range from less than 50 weight percent down to at least 0.5 weight percent.

Preferably the amine content in the basic nitrogen-containing polymer is exposed in terms of basic nitrogen. In this respect the nitrogen content in amides and similar non-basic nitrogen functionality is not part of the interacting species. A minimum of three basic groups must be present, on the average per polymer molecule and the basic nitrogen content generally will range from 4 milliequivalents (meq) per 100 grams of polymer up to 500 meq. per 100 gms. A range of 8 to 200 meq/100 gms is preferred.

The ionomeric polymers of the instant invention may be prepared prior to incorporation into the organic solvent, or by neutralization of the acid form in situ.

For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well-known to those skilled in the art, i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability, and the above operations avoid that problem.

The cataionic or basic nitrogen-containing polymer typically has a polymeric backbone containing basic groups which may be in the chain or pendant to it. It may be obtained by direct copolymerization of a monomer containing the basic nitrogen moieties with another monomer or by grafting a monomer containing the basic nitrogen moieties on to a prepolymerized chain. The typical reactions used in such synthesis are free radical reactions. The monomers used for forming the major part of such a polymer can be chosen from vinyl monomers which will lead to hydrocarbon soluble polymers such as: styrene, t-butyl styrene, acrylonitrile, isoprene, butadiene, acrylates metacrylates and vinyl acetate. Monomers containing basic nitrogen moieties will typically be monomers which contain amine alkyl amine groups or pyridine groups such as vinyl pyridine.

The styrene-vinyl pyridine copolymer of the polymer complex is formed by copolymerizing styrene and vinyl pyridine preferably via a free radical polymerization and preferably in an emulsion polymerization. The vinyl pyridine content of the copolymer is about 0.5 to about 50 weight percent, more preferably about 0.5 to about 20 weight percent. The number average molecular weight is about 10,000 to about 10,000,000 more preferably about 20,000 to about 5,000,000 and most preferably about 30,000 to about 2,000,000.

The polymer complex of the sulfonated polymer and the basic nitrogen-containing polymer are formed by forming a first solution of the sulfonate polymer in a hydrocarbon liquid and a second solution of the basic nitrogen-containing polymer in the organic liquid, wherein the organic liquid which has a solubility parameter of less than 9.5 and a viscosity of less than 35 centipoises is selected from the group consisting of mineral oil, synthetic oil, alkanes, cycloalkanes, and aromatics and mixtures thereof. The concentration of the sulfonated polymer in the first solution is about 0.005 to about 3.0 grams per 100 ml of organic liquid, more preferably about 0.001 to about 2.0, and most preferably about 0.005 to about 2.0. The concentration of the basic nitrogen-containing polymer in the second solution is about 0.0005 to about 4.0 grams per 100 ml of the organic liquid, more preferably about 0.001 to about 3.0, and most preferably about 0.005 to about 2.0. The two solutions of the sulfonated polymer and the basic nitrogen-containing polymer are mixed to form the polymer complex, wherein either the sulfonated polymer or basic nitrogen-containing polymer as a styrene-vinyl pyridine copolymer may be substantially in excess of the other. Further dilution may be accomplished by adding hydrocarbon solvent to the mixture of the two polymer solutions. The formation of the complex is schematically represented by:

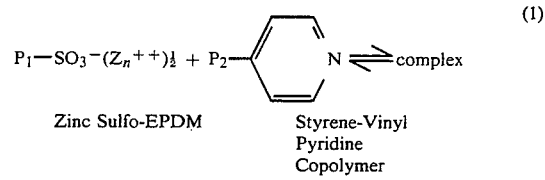

(1)

$$P_1\text{—}SO_3^-(Z_n^{++})_{\frac{1}{2}} + P_2\text{—} \langle N \rangle \rightleftharpoons \text{complex}$$

Zinc Sulfo-EPDM    Styrene-Vinyl Pyridine Copolymer

The concentration of the polymer complex in the hydrocarbon liquid as an effective drag reduction agent is about 0.001 to about 1.0 grams per 100 ml, more preferably about 0.003 to about 0.5, and most preferably about 0.006 to about 0.1. Suitable hydrocarbon liquids in which the aforementioned polymer complexes are effective drag reduction agents are selected from the group consisting of alkanes, cycloalkanes, mineral oils, synthetic oils and aromatics and mixtures thereof.

DESCRIPTION OF THE PREFERRED EMBODIMENTS

Figure 1:
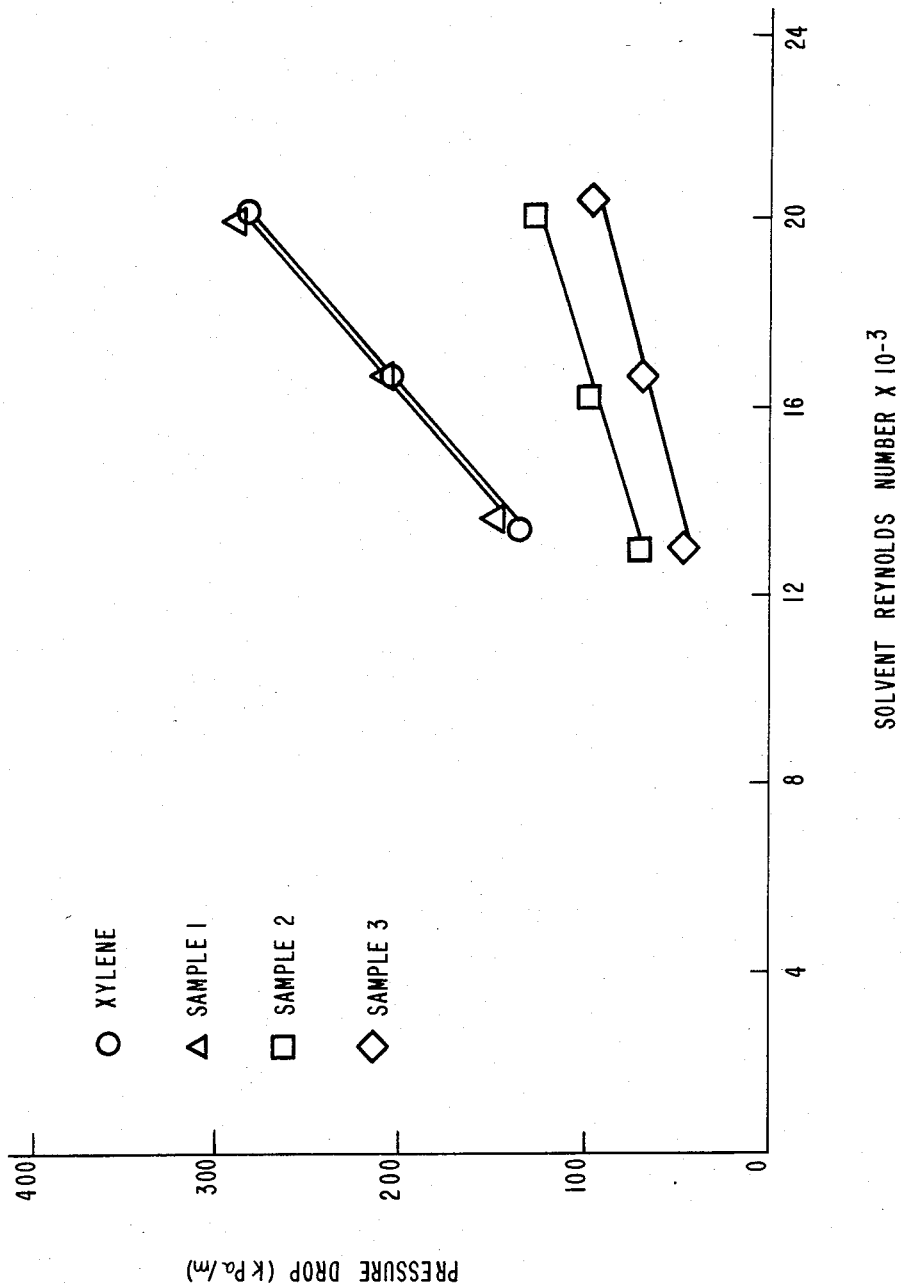
FIG. 1 illustrates a plot of pressure drop versus solvent Reynolds number for different polymeric solutions. It can be seen that some polymeric solutions offer a reduction in pressure drop for the same Reynolds number over the pure solvent.

The following examples illustrate the present invention without, however, limiting the same hereto.

EXAMPLE 1

Synthesis

A representative example for the synthesis of styrene-4-vinylpyridine copolymer (SVP) is as follows:

Into a 1 liter-4 neck flask the following ingredients were introduced:

100 g distilled styrene
6.4 g sodium lauryl sulfate
240 ml. distilled water
0.4 g potassium persulfate
9.4 g 4-vinylpyridine The solution was purged with nitrogen gas for 10 minutes to remove dissolved oxygen. As the nitrogen gas purge began, the solution was heated to 55° C. After 24 hours, the polymer was precipitated from solution with methanol. Subsequently, the resulting polymer was washed several times with a large excess of methanol and dried in a vacuum oven at 60° C. for 24 hours. Elemental analysis showed a nitrogen content of 1.13 weight percent which corresponds to 8.4 mole percent 4-vinylpyridine.

EXAMPLE 2

Preparation of Sulfonated EPDM

The preparation of sulfonated EPDM has been well-described in the patent and published literature (for example, see U.S. Pat. No. 4,184,988 or ACS Monograph edited by A. Eisenberg, 1980, p. 4). A zinc sulfonated EPDM was prepared via those procedures containing 10 meq. of zinc sulfonate, designated MS-14. The resulting polymer was available as a free-flowing crumb and employed in that form as a blending component in the following examples.

EXAMPLE 3

Interpolymer Complex Composition and Solutions

Polymers A and B having anionic and cationic functionalities were dissolved in xylene at a concentration of 1.1 wt.% and 2 wt.%, respectively. Various mixtures of these two solutions were prepared.

Polymer A is a zinc-sulfo-EPDM at 10 meq. sulfonation level on a 90,000 weight average molecular weight EPDM backbone. The backbone is composed of 55% ethylene, 40% propylene, and 5% ethylidene-norbornene by weight. It was made following the procedure of Example 2.

Polymer B is a copolymer of styrene and vinyl pyridine at about an 8 mole % composition of vinyl pyridine. The weight average molecular weight of this polymer is about 2 million.

Mixtures of the xylene solutions of these two polymers were blended with additional xylene, as necessary, to yield interpolymer complexes solutions in xylene with total polymer concentrations and cationic ($N^+$) to anionic ($SO_3^-$) ratios shown in Table I. The table also shows the resulting solution viscosities at 25° C. and at shear rate of 60 sec.$^{-1}$.

This example shows that an interpolymer complex solution at relatively low concentration, made up of Polymers A and B described above, can have a significantly higher viscosity than the solutions of the individual polymers. It indicates that a complex of both polymers is formed and that this complex behaves like having a very large structure. The viscosity of the interpolymer complexes F, G and H at 5000 ppm in Table I could not be accurately measured due to a very high viscosity and gel-like solutions at low shear rates.

EXAMPLE 4

Destruction of Interpolymer Complex Solutions

Two percent by weight of methyl alcohol was added to Composition E of Table I, Example 3, at 5000 ppm polymer. The viscosity dropped from 128 cP to 1.2 cP.

This example shows that the complex can be destroyed effectively and selectively by adding an ingredient, such as methanol. The high viscosity obtained by the creation of an interpolymer complex was dropped to the level which can be expected from mixing the two individual polymers if they would have not formed a complex.

EXAMPLE 5

Drag Reduction of Novel Interpolymer Complexes

Drag reduction was evaluated by flowing polymer/xylene solutions through a 2.13 mm inside diameter stainless steel tube and measuring the resulting frictional pressure drop. The flows were generated by loading a pair of stainless steel tanks (1 liter each) with a previously dissolved polymer/xylene solution, pressurizing the tanks with nitrogen gas (300 kPa) and discharging the solution through the tube test section. Pressure drops were measured across a 48 cm straight segment of the tube with a pair of flush mounted tube wall pressure taps and a differential pressure transmitter. Flow rates were measured by weighing samples of the effluent liquid collected over the measured time periods.

Flow rates in the drag reduction experiments ranged from about 12 to 21 g/s; these corresponded to solvent Reynolds numbers from about 12,000 to 21,000 (solvent Reynolds number=mean flow velocity×tube diameter÷solvent kinematic viscosity). Drag reduction was measured by comparing pressure drops of the polymer/xylene solutions with pressure drops of the xylene solvent at equal flow rates. Results were expressed as percent drag reduction which is defined as follows:

$$\% \text{ Drag Reduction} = \frac{\text{Pressure Drop of Solvent} - \text{Pressure Drop of Solution}}{\text{Pressure Drop of Solvent}} \times 100$$

Typical drag reduction results from experiments with a novel polymer complex are given in Table II. Additional data relating measured pressure drops to solvent Reynolds numbers are given in FIG. 1. Sample numbers in the figure correspond to those in Table II.

The results show that drag reduction from the polymer complex solution (Sample 3) is significantly better than the combined drag reductions from the component solutions (Samples 1 and 2). Results from a separate set of experiments with a different batch of SVP solutions also suggest that the improved drag reduction of the polymer complex solution is larger than the drag reduction that would be obtained if the S-EPDM in the complex solution were replaced by an equal weight of SVP. The latter results demonstrate that improved drag reduction can be obtained by replacing part of high molecular weight polymer solute with an equal weight of a significantly lower molecular weight polymer.

TABLE I

VISCOSITY OF INTERPOLYMER COMPLEXES SOLUTIONS IN XYLENE AT 25° C. AND SHEAR RATE OF 60 SEC$^{-1}$

| Composition | Interpolymer Composition* | | Viscosity, cP Total Polymer Concentration | |
|---|---|---|---|---|
| | $N^+/SO_3^-$ (mole/mole) | $N^+$ polymer/$SO_3^-$ polymer (ppm/ppm) | 3000 ppm | 5000 ppm |
| A* | 0 | 0 | 0.9 | 1.2 |
| B | 0.29 | 0.037 | 2.7 | 3.3 |
| C | 0.60 | 0.076 | 2.1 | 23.0 |
| D | 0.92 | 0.116 | 2.3 | 56.2 |
| E | 1.25 | 0.158 | 2.8 | 128.0 |
| F | 1.60 | 0.202 | 4.2 | ** |
| G | 2.55 | 0.321 | 9.0 | ** |
| H | 3.61 | 0.455 | 12.6 | ** |

TABLE I-continued

VISCOSITY OF INTERPOLYMER COMPLEXES SOLUTIONS
IN XYLENE AT 25° C. AND SHEAR RATE OF 60 SEC$^{-1}$

| Composition | Interpolymer Composition* | | Viscosity, cP Total Polymer Concentration | |
|---|---|---|---|---|
| | $N^+/SO_3^-$ (mole/mole) | $N^+$ polymer/$SO_3^-$ polymer (ppm/ppm) | 3000 ppm | 5000 ppm |
| I* | ∞ | ∞ | 1.6 | 2.7 |

*o and ∞ refer to one of the two polymers alone.
**estimated to be between 500–1000 at 60 sec.$^{-1}$; much higher at lower rates. Viscosity of xylene at 25° C. is 0.6 cP.

TABLE II

DRAG REDUCTION DATA

| Sample | S-EPDM[a] (wppm) | SVP[b] (wppm) | % Drag Reduction at Solvent Reynolds Number = 20,000 |
|---|---|---|---|
| 1 | 260 | 0 | 0 |
| 2 | 0 | 470 | 56 |
| 3 | 260 | 470 | 67 |

[a]Polymer A from Example 3
[b]Polymer B from Example 3

Since many modifications and variations of this invention may be made without departing from the spirit or scope of the invention thereof, it is not intended to limit the spirit or scope thereof to the specific examples thereof.

What is claimed is:

1. A process for decreasing the frictional drag of a hydrocarbon liquid flowing through a pipe or conduit having a continuous bore therethrough, which comprises the step of adding a polymer complex of an anionic polymer and a cationic polymer to said hydrocarbon liquid at a concentration level of about 0.001 to about 1.0 gram per 100 ml. of said hydrocarbon liquid, said cationic polymer being a styrene vinyl pyridine copolymer, said styrene vinyl pyridine copolymer containing about 0.5 to about 50 weight percent of vinyl pyridine, said anionic polymer being a neutralized sulfonated polymer having about 0.1 to about 25 mole percent sulfonate groups, said sulfonate groups being at least 50% neutralized with a transition metal ion, said sulfonated polymer having a molecular weight as measured by GPC of about 1,000 to about 10,000,000 and said sulfonated polymer having a polymeric backbone selected from the group consisting of polystyrene, t-butylstyrene, ethylene propylene terpolymers, polyisobutylene, ethylene and polyisoprene.

2. The process according to claim 1, wherein weight ratio between the dissolved sulfonated polymer and the dissolved basic nitrogen-containing polymer is about 0.2 to about 30, or wherein stoichiometric ratio between sulfonate and basic nitrogen groups of the dissolved polymers is about 0.1 to about 10.

* * * * *